US007188182B2

(12) United States Patent
Andrew et al.

(10) Patent No.: US 7,188,182 B2
(45) Date of Patent: Mar. 6, 2007

(54) SELECTING AN APPROPRIATE TRANSFER MECHANISM FOR TRANSFERRING AN OBJECT

(75) Inventors: Felix G. T. I. Andrew, Seattle, WA (US); Dominique Fortier, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 10/102,298

(22) Filed: Mar. 20, 2002

(65) Prior Publication Data
US 2003/0182441 A1 Sep. 25, 2003

(51) Int. Cl.
G06F 15/16 (2006.01)

(52) U.S. Cl. ...................... 709/228; 709/237

(58) Field of Classification Search ............... 709/203, 709/206, 227, 228, 236, 237, 238, 232, 200–202, 709/217–226; 370/252, 401, 244, 466; 455/413; 713/176
See application file for complete search history.

(56) References Cited

U.S. PATENT DOCUMENTS

| 5,309,562 | A | * | 5/1994 | Li ............................... 709/237 |
| 5,412,375 | A | | 5/1995 | Wood .................... 340/825.03 |
| 6,006,091 | A | | 12/1999 | Lupien ....................... 455/435 |
| 6,055,575 | A | * | 4/2000 | Paulsen et al. ............. 709/229 |
| 6,084,874 | A | | 7/2000 | Nguyen et al. ............. 370/352 |
| 6,111,886 | A | * | 8/2000 | Stewart ....................... 370/438 |
| 6,181,940 | B1 | * | 1/2001 | Rune ........................ 455/435.2 |
| 6,198,920 | B1 | | 3/2001 | Doviak et al. .............. 455/426 |
| 6,208,622 | B1 | * | 3/2001 | Makrucki ................... 370/252 |
| 6,246,871 | B1 | * | 6/2001 | Ala-Laurila ................ 455/413 |
| 6,266,701 | B1 | * | 7/2001 | Sridhar et al. .............. 709/232 |
| 6,278,706 | B1 | | 8/2001 | Gibbs et al. ................ 370/352 |
| 6,449,285 | B1 | * | 9/2002 | Mills .......................... 370/466 |
| 6,823,455 | B1 | * | 11/2004 | Macy et al. ................ 713/176 |

(Continued)

FOREIGN PATENT DOCUMENTS

EP 0942554 9/1999

(Continued)

OTHER PUBLICATIONS

Axon: Application-Oriented Lightweight Transport Protocol Design, (Conference Proceedings) J.P.G. Sterbenz and G.M. Parulkar, Proceedings of the 10th International Conference on Computer Communication, pp. 379-389.

(Continued)

Primary Examiner—Moustafa M. Meky
(74) Attorney, Agent, or Firm—Workman Nydegger

(57) ABSTRACT

A sending system, which includes one or more computer systems including a sending computer system, sends, via a predetermined transport, data indicative of an intent to send an object from the sending computer system. A receiving system, which includes one or more computer systems including a receiving computer system, receives the data indicative of an intent to send the object. In some embodiments, the receiving system may analyze the data indicative of an intent to send the object and select an appropriate transfer mechanism to receive the object. The receiving system sends data indicative of an intent to receive the object at the receiving computer system. The sending system may receive the data indicative of an intent to receive the object, may analyze the data, and select an appropriate transfer mechanism to send the object.

66 Claims, 6 Drawing Sheets

U.S. PATENT DOCUMENTS

| | | | |
|---|---|---|---|
| 6,917,594 B2 * | 7/2005 | Feuerstraeter et al. | 370/244 |
| 7,123,621 B1 * | 10/2006 | Niida et al. | 370/402 |
| 2002/0191639 A1 * | 12/2002 | Norby | 370/466 |

FOREIGN PATENT DOCUMENTS

| | | |
|---|---|---|
| EP | 1033850 | 9/2000 |
| WO | WO01/35585 | 5/2001 |
| WO | WO02/03647 | 1/2002 |
| WO | WO02/17565 | 2/2002 |

OTHER PUBLICATIONS

Axon: Application-Oriented Lightweight Transport Protocol Design, (Technical Paper) J.P.G. Sterbenz and G.M. Parulkar, Publ. Washington University Department of Computer Science, Sep. 1989, pp. 1-44.

IP With QOS Guarantees Via GEO Satellite Channels: Performance Issues, A. Iera et al., IEEE Personal Communications, Pub. by IEEE, USA, vol. 8, No. 3, Jun. 2001, pp. 14-19.

* cited by examiner

SELECTING AN APPROPRIATE TRANSFER MECHANISM FOR TRANSFERRING AN OBJECT

BACKGROUND OF THE INVENTION

1. The Field of the Invention

The present invention relates to transferring objects between computer systems. More specifically, the present invention relates to systems, methods, and computer program products for selecting an appropriate transfer mechanism, from among a number of compatible transfer mechanisms, when transferring an object from a sending computer system to a receiving computer system.

2. Background and Relevant Art

Many computer systems, especially wireless computer systems, have multiple transfer mechanisms that may be utilized when transferring an object. For example, Personal Digital Assistants often include the functionality to transfer data via infrared ("IR"), via other wireless LAN technologies, such as BLUETOOTH™ and wireless Transmission Control Protocol/Internet Protocol ("TCP/IP"), and via wireless technologies supported by mobile carriers, such as General Packet Radio Service ("GPRS") and Code-Division Multiple Access ("CDMA"). However, not all computer systems may be configured to utilize the same transfer mechanisms. For example, a sending computer system may be configured to utilize IR, BLUETOOTH™, and CDMA and a receiving computer system may be configured to utilize IR, wireless TCP/IP, and CDMA. Thus, even if the sending computer system views BLUETOOTH™ as a desirable transfer mechanism and the receiving computer system views wireless TCP/IP as a desirable transfer mechanism, neither of these transfer mechanisms may be utilized. However, this incompatibility may be unknown to a user.

Identifying compatible transfer mechanisms between computer systems may require a user to be aware of substantial configuration information before a data transfer may occur. A user may need to be aware of configuration information not only for their computer system, but also for another unfamiliar computer system that will either send an object to or receive an object from the user's computer system. A user may lack the technical skills to manipulate such configuration information to identify compatible transfer mechanisms.

Even if a user has the technical skills to manipulate configuration information to identify compatible transfer mechanisms, a user may lack the skills to select an appropriate transfer mechanism from among the compatible transfer mechanisms. Each transfer mechanism may be associated with multiple transfer characteristics that define how an object is transferred. A transfer mechanism may be associated with transfer characteristics such as bandwidth, latency, signal strength, packet size, power consumption, support for authentication and/or encryption, and time to establish a connection.

Different transfer mechanisms may have different values for transfer characteristics. For example, IR may have a representative bandwidth of ten and GPRS may have a representative bandwidth of seven. Thus, transfer of an object may be completed in a timelier manner when the object is transferred via IR. However, IR may be associated with a representative power consumption of five and GPRS may be associated with a representative power consumption of one. Thus, more power may be consumed when transferring an object via IR than when transferring an object via GPRS. In this case, the appropriate transfer mechanism for transferring an object may vary depending on whether speed or conservation of power is of greater importance.

When multiple transfer mechanisms are each associated with numerous transfer characteristics of differing values, selecting an appropriate transfer mechanism may require a substantial number of mathematical computations. A user attempting to select an appropriate transfer mechanism under these conditions may become confused or may lack the technical skills to perform such computations. Even if a user possesses the requisite technical skills, the user may lack the time or desire to perform the computations.

The problem may be significantly compounded in environments where the values of transfer characteristics vary over time and thereby cause previously desirable transfer mechanisms to become less desirable. For example, a BLUETOOTH™ transfer mechanism may typically have significantly greater bandwidth than a GPRS transfer mechanism, however due to congestion on a BLUETOOTH™ network, the GPRS transfer mechanism may be more desirable at a certain time. If the values of transfer characteristics change rapidly or frequently, mathematical computations may need to be performed in a time sensitive manner to accurately represent which transfer mechanisms are currently more desirable. In these situations, it may be impractical for a user to perform such time sensitive computations, and it may in fact be impossible for a user to perform computations at the same rate network conditions change.

It may also be that an administrative entity desires to limit the use of a particular transfer mechanism under certain conditions. For example, a mobile carrier service provider may desire that a particular transfer mechanism be utilized only when conditions are advantageous to the mobile carrier. This may occur when a mobile carrier utilizes both shared and proprietary transfer mechanisms. If, when an object is to be transferred, a shared transfer mechanism has relatively low usage, the mobile carrier may desire to utilize the shared transfer mechanism. On the other hand, if the shared transfer mechanism has a relatively high usage, the mobile carrier may desire to utilize a proprietary transfer mechanism. A significant number of mathematical computations may be required to determine whether the use of a particular transfer mechanism is advantageous at a given point in time. Technical personnel associated with an administrative entity may lack the time or desire to perform such computations.

Therefore, what are desired are systems, methods, and computer program products, for selecting an appropriate transfer mechanism for transferring an object.

BRIEF SUMMARY OF THE INVENTION

The principles of the present invention provide for selecting an appropriate transfer mechanism when transferring an object between a sending computer system and a receiving computer system.

Data indicative of an intent to send an object from a sending computer system (hereinafter also called "intent-to-send data") is sent via a predetermined transport. The predetermined transport may be a transfer mechanism that has an increased likelihood of being compatible with many computer systems. For example, in a wireless environment, many Personal Digital Assistants ("PDAs") are compatible with data transfer via infrared ("IR") transfer mechanisms. The predetermined transport may be predetermined via a user selection or hard-coded into a software module by a programmer. Intent-to-send data may include a network address of the sending computer system, as well as the characteristics of one or more transfer mechanisms the sending computer system may utilize when transferring the object. Intent-to-send data may indicate an intent to send an object from the sending computer system to a receiving computer system.

In some embodiments, data indicative of an intent to receive the object (hereinafter also called "intent-to-receive data") is received. Intent-to-receive data may be received at the sending computer system in response to sending intent-to-send. Intent-to-receive data may include a network address of the receiving computer system, as well as, the characteristics of one or more transfer mechanisms the receiving computer system may utilize when receiving an object. Intent to receive data may indicate an intent of the receiving computer system to receive an object sent from the sending computer system.

In embodiments where intent-to receive data includes one or more transfer mechanisms the receiving computer system is configured to utilize, the sending computer system may identify transfer mechanisms compatible with both the sending computer system and the receiving computer system. For example, if the sending computer system is configured to utilize IR, General Packet Radio Service ("GPRS"), Global System for Mobile Communications ("GSM"), and BLUETOOTH™ and the receiving computer system is configured to utilize IR, wireless Transmission Control Protocol/Internet Protocol ("TCP/IP"), GSM, and Code-Division Multiple Access ("CDMA"), the sending computer system may identify IR and GSM as compatible transfer mechanisms.

Based on the characteristics of the identified transfer mechanisms, an appropriate transfer mechanism is selected. This may include the sending computer system selecting an appropriate transfer mechanism. Characteristics of transfer mechanisms may include, for example, protocols, bandwidth, latency, cost, signal strength, power consumption, packet size, support for authentication and/or encryption time to establish connection, or other characteristics that quantify the capabilities of a transfer mechanism. Decision logic may be used to analyze characteristics of each identified transfer mechanisms. Likewise, decision logic may be used to combine or aggregate one or more characteristics for each transfer mechanism to calculate the representative appropriateness of a transfer mechanism. The results of the decision logic may be used to select an appropriate transfer mechanism.

In some embodiments, the receiving computer system may receive characteristics of one or more transfer mechanisms available to the sending computer system included in intent-to-send data. The receiving computer system may identify which of the one or more transfer mechanisms are compatible with the receiving computer system and the sending computer system. Likewise, the receiving computer system selects, based on the characteristics of the identified transfer mechanisms, an appropriate transfer mechanism for receiving the object at the receiving computer system. The receiving computer system may then include this selection in intent-to-receive data that is sent to the sending computer system.

In some embodiments, a sending computer system may be included in a sending system that also included one or more other computer systems. These one or more computer systems may be associated with the sending computer system and may initiate or negotiate transfers for the sending computer system. Likewise, in some embodiments, a receiving computer system may be included in a receiving system that also includes one or more other computer systems. These one or more computer systems may be associated with the receiving computer system and may initiate or negotiate transfers for the receiving computer system.

Selecting an appropriate transfer mechanism based on exchanged data relieves users from having to enter configuration information to facilitate the transfer of an object. The use of decision logic included in computer systems also increases the chance that a selected transfer mechanism is indeed an appropriate transfer mechanism based on the current network conditions. That is, computer systems may perform calculations at a rate much greater than a user and thus there is an increased chance of selecting an appropriate transfer mechanism in light of changing network conditions.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
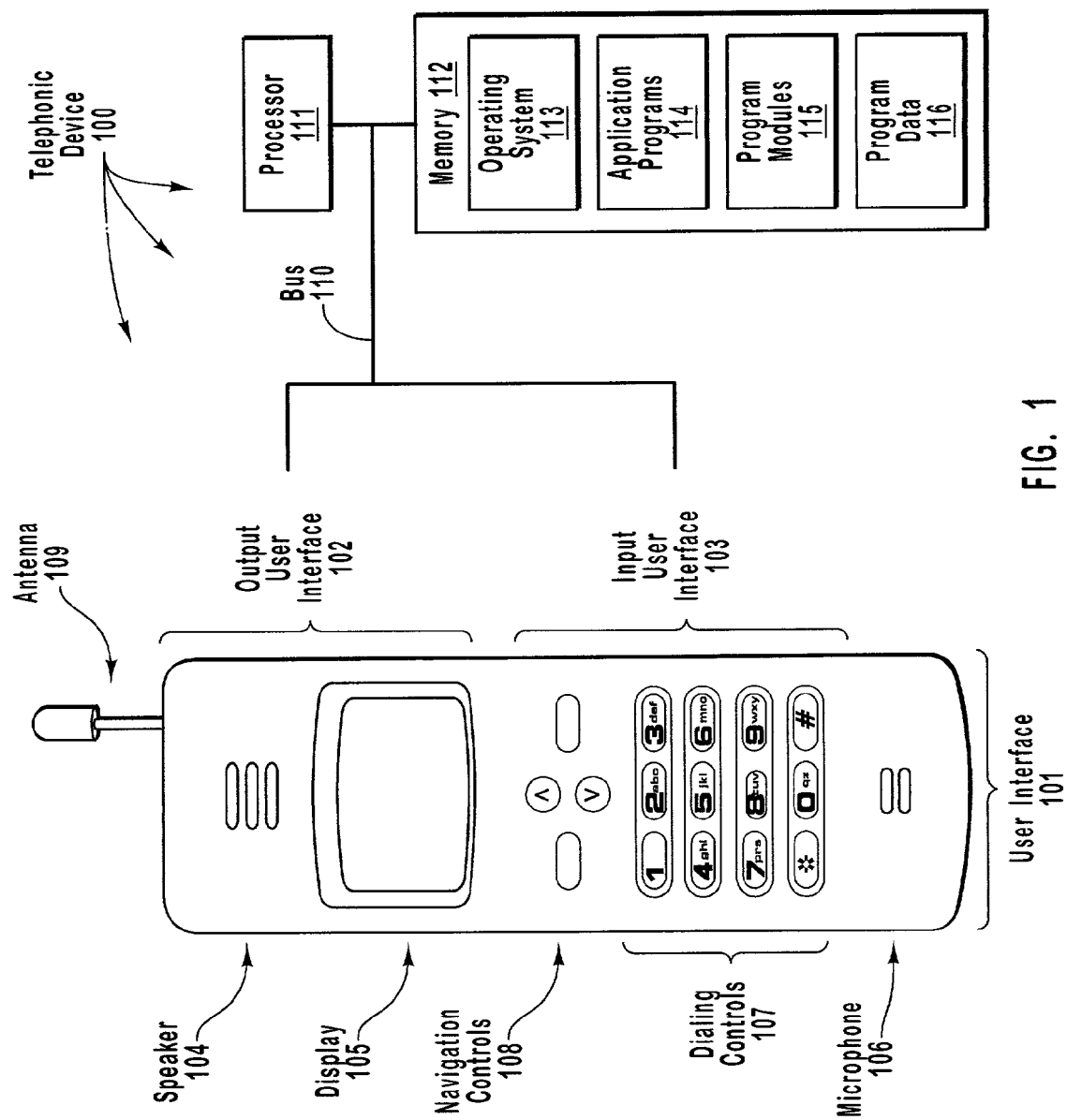
FIG. 1 illustrates an example of a telephonic device that provides a suitable operating environment for the present invention.

The present invention extends to systems, methods, and computer program products for selecting an appropriate transfer mechanism for transferring an object. A sending computer system may be configured to utilize one or more transfer mechanisms. Likewise, a receiving computer system may be configured to utilize one of more transfer mechanisms. However, the sending computer system and the receiving computer system may have only a limited number, if any, transfer mechanisms in common. Data associated with configured transfer mechanisms is exchanged between the sending and receiving system. Based on the exchanged data, an appropriate transfer mechanism for transferring an object is selected.

In operation, a sending system sends, via a predetermined transport, data indicative of an intent to send (hereinafter also called "intent-to-send data") an object. A sending system may include a sending computer system, as well as other computer systems. The predetermined transport may be a transfer mechanism that has a higher probability of compatibility with a variety of computer systems. For example, in a mobile environment the predetermined transport may be infrared ("IR"), which is compatible with a variety of mobile computer systems. Intent-to-send data may include transfer mechanisms, associated characteristics and/or values of associated characteristics that are available to the sending computer system.

A receiving system may respond to the sending system with data indicative of an intent to receive (hereinafter also called "intent-to-receive data") the object. A receiving system may include a receiving computer system, as well as other computer systems. In some embodiments, the receiving system may include transfer mechanisms, associated characteristics and/or values of associated characteristics that are available to the receiving computer system in intent-to-receive data. In these embodiments, the sending system may receive the intent-to-receive data, identify compatible transfer mechanisms, and select an appropriate transfer mechanism. In other embodiments, after receiving intent-to-send data, a receiving system may identify compatible transfer mechanisms and select an appropriate transfer mechanism. The selected transfer mechanism may then be included in intent-to-receive data.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a telephonic device 100. The telephonic device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The telephonic device 100 may also have an antenna 109 if the telephonic device 100 has wireless capabilities.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, telephonic device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in telephonic device 100 is not important to the present invention. Telephonic device 100 may also include mass storage devices (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In this description and in the following claims, a "logical communication path" is defined as any communication path that may enable the transport of electronic data between two entities such as computer systems or modules. The actual physical representation of a communication path between two entities is not important and may change over time. A logical communication path may include portions of a system bus, a local area network, a wide area network, the Internet, combinations thereof, or portions of any other path that may facilitate the transport of electronic data. Logical communication paths may include hardwired links, wireless links, or a combination of hardwired links and wireless links. Logical communication paths may also include software or hardware modules that condition or format portions of data so as to make them accessible to components that implement the principles of the present invention. Such components may include, for example, proxies, routers, firewalls, or gateways. Logical communication paths may also include portions of a Virtual Private Network ("VPN").

In accordance with the present invention, communication modules as well as associated data, including data indicative of transfer mechanisms, associated characteristics and values of the associated characteristics may be stored and accessed from any of the computer-readable media associated with telephonic device 100. For example, portions of such modules and portions of associated program data may be included in operating system 113, application programs 114, program modules 115 and/or program data 116, for storage in memory 112. Portions of such modules and associated program data may also be stored in any of the mass storage devices previously described. Execution of such modules may be performed in a distributed environment as previously described.

Figure 2:
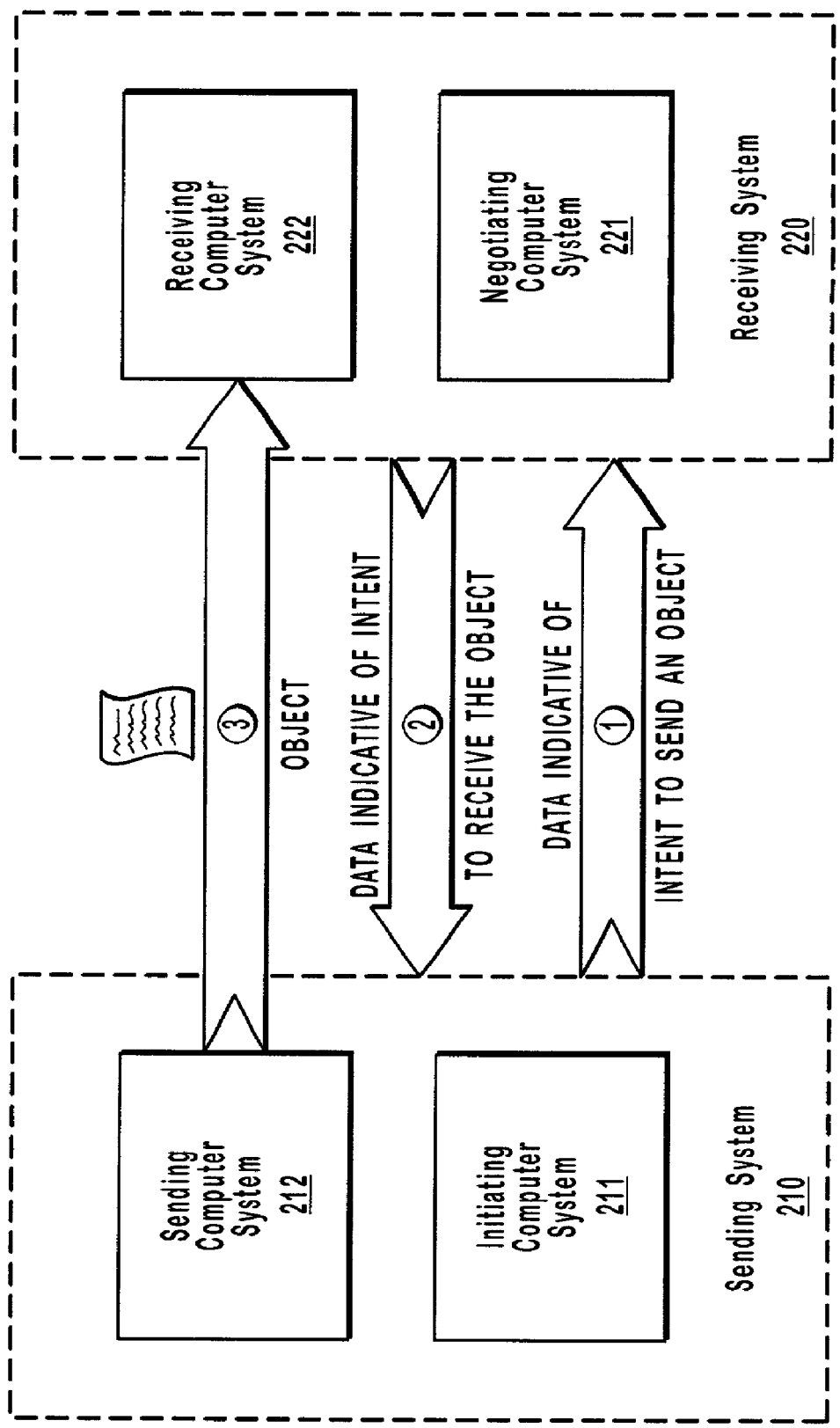
FIG. 2 illustrates an example of some of the functional components that may facilitate selecting an appropriate transfer mechanism.

FIG. 2 illustrates some of the functional components that may facilitate selecting an appropriate transfer mechanism. Shown in FIG. 2 are sending system 210 and receiving system 220. Included in sending system 210 are initiating computer system 211 and sending computer system 212. Likewise, included in receiving system 220 are negotiating computer system 221 and receiving computer system 222. Each of the computer systems illustrated in FIG. 2 may be a general-purpose computer system that includes components similar to those previously discussed herein. The computer systems included in FIG. 2 may provide complex and flexible general-purpose processing capabilities. The computer systems shown in FIG. 2 may communicate with each other, as well as, other computer systems via one or more logical communications links (not shown).

Figure 3:
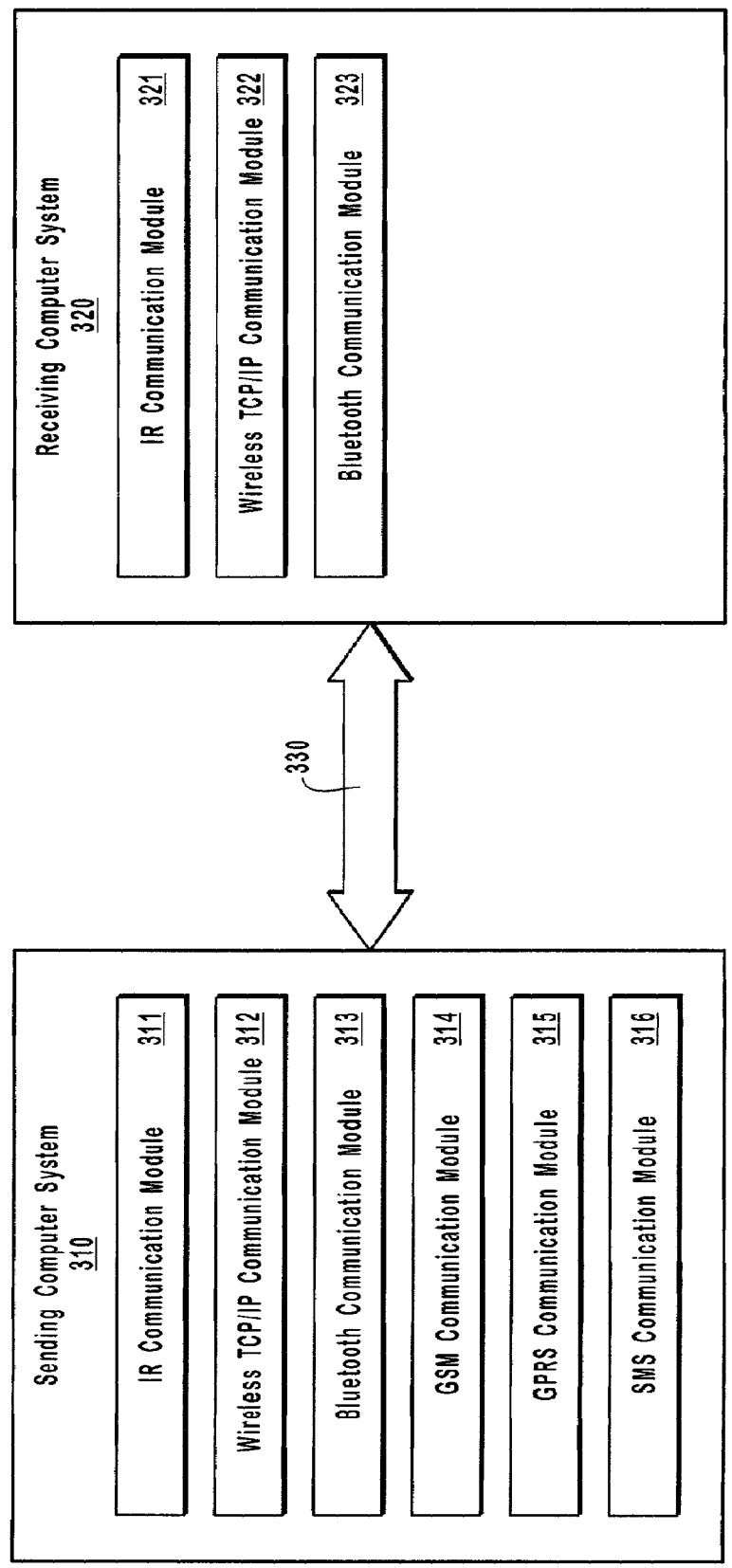
FIG. 3 illustrates an example of computer systems that include modules representing some of the transfer mechanisms that may be selected to transfer an object.

FIG. 3 illustrates an example of computer systems that include modules representative of some of the transfer mechanisms that may be selected to transfer an object. Shown in FIG. 3 are sending computer system 310 and receiving computer system 320. Each of the computer systems includes a number of communications modules that represent compatible transfer mechanisms. Sending computer system 310 and receiving computer system 320 may communicate via logical communication path 330.

As shown in FIG. 3, sending computer system 310 includes a number of different communication modules capable of communicating using different transfer mechanisms. For example, sending computer system 310 is illustrates as including IR communication module 311, wireless TCP/IP communication module 312, Bluetooth communication module 313, GSM communication module 314, GPRS communication module 315, and SMS communication module 316.

IR communication module 311 may represent that sending computer system 310 is configured to transfer an object utilizing IR transfer mechanisms. TCP/IP communication module 312 may represent that sending computer system 310 is configured to transfer an object utilizing wireless Transmission Control Protocol/Internet Protocol ("TCP/IP") transfer mechanisms. Bluetooth communication module 313 may represent that sending computer system 310 is configured to transfer an object utilizing BLUETOOTH™ transfer mechanisms. GSM communication module 314 may represent that sending computer system 310 is configured to transfer an object utilizing Global System for Mobile Communications ("GSM") transfer mechanisms. GPRS communication module 315 may represent that sending computer system 310 is configured to transfer an object utilizing General Packet Radio Service ("GPRS") transfer mechanisms. SMS communication module 316 may represent that sending computer system 310 is configured to transfer an object utilizing Short Message Service ("SMS") transfer mechanisms. The modules included in sending computer system 310 are representative of some of the communication modules that may be included in a sending computer system, such as sending computer system 212. However, sending computer systems should not be viewed as being limited to the illustrated modules.

As shown in FIG. 3, sending computer system 320 includes a number of different communication modules capable of communicating using different transfer mechanisms. For example, sending computer system 320 is illustrates as including IR communication module 321, wireless TCP/IP communication module 322, Bluetooth communication module 323.

IR communication module 321 may represent that receiving computer system 320 is configured to transfer an object utilizing IR transfer mechanisms. TCP/IP communication module 322 may represent that receiving computer system 320 is configured to transfer an object utilizing wireless TCP/IP transfer mechanisms. Bluetooth communication module 323 may represent that sending computer system 320 is configured to transfer an object utilizing BLUETOOTH™ transfer mechanisms. The modules included in receiving computer system 320 are representative of some of the communication modules that may be included in a receiving computer system, such as receiving computer system 222. However, receiving computer systems should not be viewed as being limited to the illustrated modules.

Figure 5:
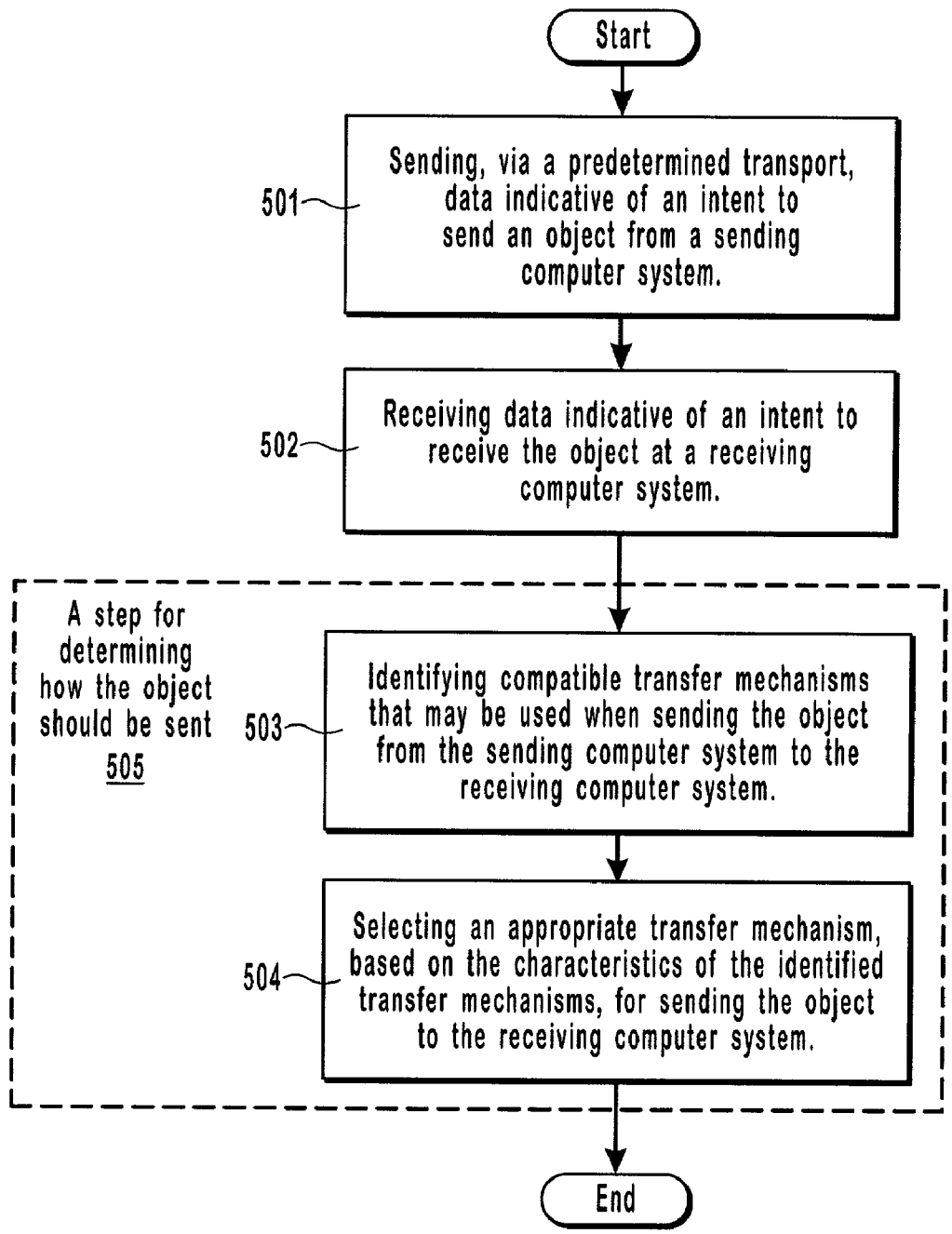
FIG. 5 is a flow diagram illustrating an example of a method for a sending system to select an appropriate transfer mechanism for transferring an object.

FIG. 5 is a flow diagram illustrating an example of a method for a sending system to select an appropriate transfer mechanism for transferring an object. The method in FIG. 5 will be discussed with reference to the functional components included in FIGS. 2 and 3.

The method in FIG. 5 may begin with sending, via a predetermined transport, data indicative of an intent to send an object (hereinafter also called "intent-to-send data") from a sending computer system (act 501). A predetermined transport may be a transfer mechanism that has an increased chance of compatibility between computer systems. For example, many Personal Digital Assistants ("PDAs") include the capability to transfer objects utilizing IR transfer mechanisms. As such, intent-to-send data may be sent from a sending system to a receiving system via an IR transfer mechanism. In some embodiments, a sending system may send intent-to-send data by utilizing SMS transfer mechanisms. It should be understood that the described predetermined transports are merely examples. It would be apparent to one skilled in the art, after having reviewed this description, that a variety of transfer mechanism may be utilized as a predetermined transport for sending intent-to-send data.

In some embodiments, use of a particular predetermined transport may be hard-coded into a module included in a computer system. In other embodiments, a predetermined transport may be user configurable through a user interface. In yet other embodiments, a sending system may attempt communication via various transfer mechanisms until a viable transfer mechanism is discovered. The viable transfer mechanism may then be utilized as the predetermined transport for sending intent-to-send data.

As shown in FIG. 2 by arrow 1, intent-to-send data is sent from sending system 210. Intent-to-send data may originate from any computer system included in sending system 210. Thus, as shown in FIG. 2, initiating computer system 211 and/or sending computer system 212 may send intent-to-send data. Intent-to-send data may include data indicating transfer mechanisms, associated characteristics and/or values of the associated characteristics. Characteristics of transfer mechanisms may include protocols, network addresses, bandwidth, latency, cost, signal strength, power consumption, packet size, support for authentication and/or encryption, time to establish connection, or other characteristics that quantify how a transfer mechanism transfers an object. Values of characteristics of transfer mechanisms may be in the form of numeric values and/or alphanumeric text values.

In some embodiments, intent-to-send data may include characteristics and/or values associated with some transfer mechanisms that are carried over other transfer mechanisms. The TCP protocol may be carried over other lower level protocols such as IR, BLUETOOTH™, GSM, and GPRS. In some cases, TCP over a particular lower level protocol may be advantageous. For example, TCP over IR may be preferred to TCP over GPRS when increased transfer speed is desirable. However, TCP over GPRS may be preferred to TCP over IR when conservation of power is desirable. Intent-to-send data may also include electronic messaging addresses, for example, electronic mail addresses or instant messaging addresses.

Intent-to-send data may be in the form of computer-readable instructions that are sent from a computer system included in sending system 210. A first group of computer-readable instructions representing an example of intent-to-send data will be described with reference to the Extensible Markup Language ("XML"). The following description is illustrative only. It would be apparent to one skilled in the art, after having reviewed this description, that a wide variety of programming languages and programming techniques may be used to implement computer-executable or computer-readable instructions that include intent-to-send data.

In the XML examples of this description, when a sole period is encountered on three consecutive lines (i.e., a vertical ellipsis), this represents that other instructions may precede the illustrated instructions or that some other instructions may follow the illustrated instructions. Numbers enclosed in brackets are line numbers and are included for informational purposes to aid in clarifying the description of the instructions.

```
[01]<CONNECTIVITY>
[02]    <IR SPEED="10" POWER="5"/>
[03]    <WIRELESS TCPIP="10.0.0.1" SUBNET="255.255.255.0"
        SPEED="10000"/>
[04]    <BLUETOOTH ADDRESS="12af287b" SPEED="5000"
        POWER="3"/>
[05]    <GSM NUMBER="2068828823" SPEED=1 PACKETS="128"/>
[06]    <GPRS NUMBER "xxffgxx" SPEED="7" POWER="1"/>
[07]    <SMS NUMBER="2068828823" SPEED="0"/>
[08]</CONNECTIVITY>
```

Shown at line 01 in the first group of instructions is the opening tag that corresponds to a closing tag at line 08. Accordingly, lines 01 through 08 define an element entitled "CONNECTIVITY". Subelements of the CONNECTIVITY element are presented at lines 02 through 07. In this first group of instructions, the CONNECTIVITY element implicitly indicates that the subelements and associated attributes at lines 02 through 07 are associated with transfer mechanisms, associated characteristics and/or values of the associated characteristics. A sending system may include the instructions at lines 01 through 08 in intent-to-send data. The instructions at lines 01 through 08 may indicate transfer mechanisms that a sending computer system is configured to utilize.

At line 02 the subelement "IR" includes the attributes "SPEED" and "POWER". The subelement IR indicates that subsequent data at line 02 is associated with IR transfer mechanisms. The attribute SPEED at line 02 represents a bandwidth characteristic associated with IR transfer mechanisms. The value "10" at line 02 may represent a value of the bandwidth characteristic and may indicate a relative speed at which an object is transferred when IR transfer mechanisms are utilized. The attribute POWER at line 02 represents a power consumption characteristic associated with IR transfer mechanisms. The value "5" at line 02 may represent a value of the power consumption characteristic and may indicate a relative amount of power that is consumed when IR transfer mechanisms are utilized. In a wireless computer system this value 5 may represent a quantity of battery power that is consumed when IR transfer mechanisms are utilized. The characteristics and values of characteristics at line 02 may quantify how IR communication module 311 transfers objects. That is, IR communication module 311 may utilize bandwidth that results in a relative speed of 10 and may utilize power that results in a relative power consumption of 5.

At line 03 the subelement "WIRELESS" includes the attributes "TCPIP", "SUBNET", and "SPEED". The subelement WIRELESS indicates that subsequent data at line 03 is associated with wireless TCP/IP transfer mechanisms. The attribute TCPIP at line 03 represents a network address characteristic associated with wireless TCP/IP transfer mechanisms. The value "10.0.0.1" at line 03 may represent a value of the network address characteristic and may indicate that an Internet Protocol version 4 ("IPv4") address is associated with a computer system, such as sending computer system 212. The attribute SUBNET at line 03 represents a subnet mask characteristic associated with wireless TCP/IP transfer mechanisms. The value "255.255.255.0" at line 3 may represent a value of the subnet mask characteristic and may indicate a particular subnet where a computer system, such as sending computer system 212, operates. The attribute SPEED at line 03 represents a bandwidth characteristic associated with wireless TCP/IP transfer mechanisms. The value "10000" at line 03 may represent a value of the bandwidth characteristic and may indicate a relative speed at which an object is transferred when wireless TCP/IP transfer mechanisms are utilized. The characteristics and values of characteristics at line 03 may quantify how wireless TCP/IP communication module 312 transfers objects. That is, wireless TCP/IP communication module 312 may send objects from and receive objects at IPv4 address 10.0.0.1, may be associated with the subnet mask 255.255.255.0, and may utilize bandwidth that results in a relative speed of 10000. As illustrated at line 03, wireless TCP/IP transfer mechanisms are associated with an IPv4 network address. However, the principles of the present invention may also be practiced with an Internet version 6 ("IPv6") or Internet Protocol next generation ("IPng") network address.

At line 04 the subelement "BLUETOOTH" includes the attributes "ADDRESS", "SPEED", and "POWER". The subelement BLUETOOTH indicates that subsequent data at line 04 is associated with BLUETOOTH™ transfer mechanisms. The attribute ADDRESS at line 04 represents a network address characteristic associated with BLUETOOTH™ transfer mechanisms. The value "12af287b" at line 04 may represent a value of the network address characteristic and may indicate a BLUETOOTH™ address associated with a computer system, such as sending computer system 212. The attribute SPEED at line 04 represents a bandwidth characteristic associated with BLUETOOTH™ transfer mechanisms. The value "5000" at line 04 may represent a value of the bandwidth characteristic and may indicate a relative speed at which an object is transferred when BLUETOOTH™ transfer mechanisms are utilized. The attribute POWER at line 04 represents a power consumption characteristic associated with BLUETOOTH™ transfer mechanisms. The value "3" at line 04 may represent a value of the power consumption characteristic and may indicate a relative amount of power that is consumed when BLUETOOTH™ transfer mechanisms are utilized. In a wireless computer system this value 3 may represent a quantity of battery power that is consumed when BLUETOOTH™ transfer mechanisms are utilized. The characteristics and values of characteristics at line 04 may quantify how wireless bluetooth communication module 313 transfers objects. That is, bluetooth communication module 313 may send objects from and receive objects at BLUETOOTH™ address 12af287b, may utilize bandwidth that results in a relative speed of 5000, and may utilize power that results in a relative power consumption of 3.

At line 05 the subelement "GSM" includes the attributes "NUMBER", "SPEED", and "PACKETS". The subelement GSM indicates that subsequent data at line 05 is associated with GSM transfer mechanisms. The attribute NUMBER at line 05 represents a telephone number characteristic associated with GSM transfer mechanisms. The value "2068828823" at line 05 may represent a value of the telephone number characteristic and may indicate a telephone number that is associated with a computer system, such as sending computer system 212. The attribute SPEED at line 05 represents a bandwidth characteristic associated with GSM transfer mechanisms. The value "1" at line 05 may represent a value of the bandwidth characteristic and may indicate a relative speed at which an object is transferred when GSM transfer mechanisms are utilized. The attribute PACKETS at line 05 represents a packets characteristic associated with GSM transfer mechanisms. The value "128" at line 05 may represent a value of the packets characteristic and may indicate a packets size (i.e. 128 bits) of packets that are transferred when GSM transfer mechanisms are utilized. The characteristics and values of characteristics at line 05 may quantify how GSM communication module 314 transfers objects. That is, GSM communication module 314 module may send objects from and receive objects at the telephone number 2068828823, may utilize bandwidth that results in a relative speed of 1, and may utilize 128 bit packets.

At line 06 the subelement "GPRS" includes the attributes "NUMBER", "SPEED", and "POWER". The subelement GPRS indicates that subsequent data at line 06 is associated with GPRS transfer mechanisms. The attribute ADDRESS at line 06 represents a network address characteristic associated with GPRS transfer mechanisms. The value "xxffgxx" at line 06 may represent a value of the network address characteristic and may indicate a GPRS address associated with a computer system, such as sending computer system 212. The attribute SPEED at line 06 represents a bandwidth characteristic associated with GPRS transfer mechanisms. The value "7" at line 06 may represent a value of the bandwidth characteristic and may indicate a relative speed at which an object is transferred when GPRS transfer mechanisms are utilized. The attribute POWER at line 06 may represent a power consumption characteristic associated with GPRS transfer mechanisms. The value "1" at line 06 may represent a value of the power consumption characteristic and may indicate a relative amount of power that is consumed when GPRS transfer mechanisms are utilized. In a wireless computer system this value 1 may represent a quantity of battery power that is consumed when GPRS transfer mechanisms are utilized. The characteristics and values of characteristics at line 06 may quantify how GPRS communication module 315 transfers objects. That is, GPRS communication module 315 may send objects from and receive objects at GPRS address xxffgxx, may utilize bandwidth that results in a relative speed of 7, and may utilize power that results in a relative power consumption of 1.

At line 07 the subelement "SMS" includes the attributes "NUMBER" and "SPEED". The subelement SMS indicates that subsequent data at line 07 is associated with SMS transfer mechanisms. The attribute NUMBER at line 07 represents a telephone number characteristic associated with SMS transfer mechanisms. The value "2068828823" at line 07 may represent a value of the telephone number characteristic and may indicate a telephone number that is associated with a computer system, such as sending computer system 212. The attribute SPEED at line 07 represents a bandwidth characteristic associated with SMS transfer mechanisms. The value "0" at line 07 may represent a value of the bandwidth characteristic and may indicate a relative speed at which an object is transferred when SMS transfer mechanisms are utilized. The characteristics and values of characteristics at line 07 may quantify how SMS communication module 316 transfers objects. That is, SMS communication module 316 module may send objects from and receive objects at the telephone number 2068828823 and may utilize bandwidth that results in a relative speed of 0.

It should be understood that the first group of computer-readable instructions is merely an example of intent-to-send data. It would be apparent to one skilled in the art, after having reviewed this description, that a wide variety of transfer mechanisms, characteristics of transfer mechanisms, and values of characteristics of transfer mechanisms may be included in intent-to-send data.

The method in FIG. 5 may include receiving data indicative of an intent to receive the object (hereinafter also called "intent-to-receive data") at the receiving computer system (act 502). As shown in FIG. 2 by arrow 2, this may include sending system 210 receiving intent-to-receive data that was sent from receiving system 220. Intent-to-receive data may originate from any computer system included in receiving system 220. Thus, as shown in FIG. 2, intent-to-receive data may originate at negotiating computer system 221 and/or receiving computer system 222. Intent-to-receive data may include data indicating transfer mechanisms, associated characteristics and/or values of the associated characteristics.

In some embodiments, intent-to-receive data may include characteristics and/or values associated with some transfer mechanisms that are carried over other transfer mechanisms. Intent-to-receive data may also include electronic messaging addresses, for example, electronic mail addresses or instant messaging addresses.

Intent-to-receive data may be in the form of computer-readable instructions that are received at a computer system included in sending system 210. An second group of computer-readable instructions representing an example of intent-to-receive data will be described with reference to the Extensible Markup Language ("XML"). The following description is illustrative only. It would be apparent to one skilled in the art, after having reviewed this description, that a wide variety of programming languages and programming techniques may be used to implement computer-executable or computer-readable instructions that include intent-to-receive data.

```
[01]<CONNECTIVITY>
[02]    <IR SPEED="10" POWER="5">
[03]        <PROTOCOL TYPE="OBEX"/>
[04]    </IR>
[05]    <WIRELESS TCPIP="10.0.0.1" SUBNET="255.255.255.0"
        SPEED="10000">
[06]        <PROTOCOL TYPE="DPLAY">
[07]            <PORT ID="10" />
[08]            <PORT ID="20"/>
[09]        </PROTOCOL>
[10]        <PROTOCOL TYPE="OBEX"/>
[11]    </WIRELESS>
[12]    <BLUETOOTH ADDRESS="12af287b" SPEED="5000"
        POWER="3">
[13]        <PROTOCOL TYPE="SDP"/>
[14]    </BLUETOOTH>
[15]    <PREFERREDORDER>
[16]        <WIRELESS/>
[17]        <IR/>
[18]        <BLUETOOTH/>
[19]    </PREFERREDORDER>
[20]</CONNECTIVITY>
```

Shown at line 01 in the second group of instructions is the opening tag that corresponds to a closing tag at line 20. Accordingly, lines 01 through 20 define an element entitled "CONNECTIVITY". Subelements represented of the CONNECTIVITY element are presented at lines 02 through 19. In this second group of instructions, the CONNECTIVITY element indicates that the subelements and attributes at lines 02 through 19 are associated with transfer mechanisms, associated characteristics and/or values of the associated characteristics. A receiving system may include the instructions at lines 01 through 20 in intent-to-receive data. The instructions at lines 01 through 20 may indicate transfer mechanisms a receiving computer system is configured to utilize.

Lines 02 through 04 may indicate that a receiving computer system is compatible with IR transfer mechanisms. At line 02 the subelement "IR" includes the attributes "SPEED" and "POWER". The subelement IR indicates that subsequent data at line 02 is associated with IR transfer mechanisms The attribute SPEED at line 02 represents a bandwidth characteristic associated with IR transfer mechanisms and the attribute POWER at line 02 represents a power consumption characteristic associated with IR transfer mechanisms. The characteristics and values of characteristics at line 02 may be similar to those discussed at line 02 in the description of the first group of computer-readable instructions, The characteristics and values of characteristics at line 02 may also quantify how IR communication module 321 transfers objects. That is, IR communication module 321 may utilize bandwidth that results in a relative speed of 10 and may utilize power that results in a relative consumption of 5.

At line 03 the subelement "PROTOCOL" includes the attribute "TYPE". The subelement PROTOCOL indicates that subsequent data at line 03 is associated with a protocol that may be utilized by IR transfer mechanisms. The attribute TYPE at line 03 is associated with the value "OBEX". The value OBEX at line 03 may represent the Object Exchange ("OBEX") protocol and may indicate that IR transfer mechanisms are configured to utilize the OBEX protocol to transfer an object. The characteristics and values of characteristics at line 03 may quantify how IR communication module 321 transfers objects. That is, IR communication module 321 may be configured to utilize the OBEX protocol to transfer an object.

Lines 05 through 11 may indicate that a receiving computer system is compatible with wireless TCP/IP transfer mechanisms. At line 05 the subelement "WIRELESS" includes the attributes "TCPIP", "SUBNET", and "SPEED". The subelement WIRELESS indicates that subsequent data at line 05 is associated with wireless TCP/IP transfer mechanisms. The attribute TCPIP at line 05 represents a network address characteristic associated with wireless TCP/IP transfer mechanisms, the attribute SUBNET at line 05 represents a subnet mask characteristic associated with wireless TCP/IP transfer mechanisms, and the attribute SPEED at line 05 represents a bandwidth characteristic associated with wireless TCP/IP transfer mechanisms. The characteristics and values of characteristics at line 05 may be similar to those discussed at line 03 in the description of the first group of computer-readable instructions. The characteristics and values of characteristics at line 05 may also quantify how wireless TCP/IP communication module 322 transfers objects. That is, wireless TCP/IP communication module 322 may send objects from and receive objects at IPv4 address 10.0.0.1, may be associated with the subnet mask 255.255.255.0, and may utilize bandwidth that results in a relative speed of 10000.

At line 06 the subelement "PROTOCOL" includes the attribute "TYPE". The subelement PROTOCOL indicates that subsequent data at line 06 is associated with a protocol that may be utilized by wireless TCP/IP transfer mechanisms. The attribute TYPE at line 06 is associated with the value "DPLAY". The value DPLAY at line 06 may represent the Direct Play ("DPLAY") protocol and may indicate that wireless TCP/IP transfer mechanisms are configured to utilize the DPLAY protocol to transfer an object.

At lines 07 and 08 the subelements "PORT" include the attribute "ID". The subelement PORT indicates that subsequent data at lines 07 and 08 is associated with a communications port. The attribute "ID" at line 07 is associated with the value "10" and the attribute "ID" at lines 08 is associated with the value "20". The value "10" at line 07 and the value "20" at line 08 may represent values of a port identification characteristic and may indicate a port number included in a computer system. The characteristics and values of characteristics at lines 06 through 09 may quantify how wireless TCP/IP communication module 322 transfers objects. That is, wireless TCP/IP communication module 322 may be configured to utilize the DPLAY protocol to transfer an object. Wireless TCP/IP communication module 322 may be configured to utilize ports 10 and 20 when transferring an object via the DPLAY protocol.

At line 10 the subelement "PROTOCOL" includes the attribute "TYPE". The subelement PROTOCOL indicates that subsequent data at line 10 is associated with a protocol that may be utilized by wireless TCP/IP transfer mechanisms. The attribute TYPE at line 10 is associated with the value "OBEX". The value OBEX at line 10 may represent the Object Exchange ("OBEX") protocol and may indicate that wireless TCP/IP transfer mechanisms are configured to utilize the OBEX protocol to transfer an object. The characteristics and values of characteristics at line 10 may quantify how wireless TCP/IP communication module 322 transfers objects. That is, wireless TCP/IP communication module 322 may be configured to utilize the OBEX protocol to transfer an object.

Lines 12 through 14 may indicate that a receiving computer system is compatible with BLUETOOTH™ transfer mechanisms. At line 12 the subelement "BLUETOOTH" includes the attributes "ADDRESS", "SPEED", and "POWER". The subelement BLUETOOTH indicates that subsequent data at line 12 is associated with BLUETOOTH™ transfer mechanisms. The attribute ADDRESS at line 12 may represent a network address characteristic associated with BLUETOOTH™ transfer mechanisms, the attribute SPEED at line 12 may represent a bandwidth characteristic associated with BLUETOOTH™ transfer mechanisms, and the attribute POWER at line 12 may represent a power consumption characteristic associated with BLUETOOTH™ transfer mechanisms. The characteristics and values of the characteristics at line 12 may be similar to the relative values discussed at line 04 in the description of the first group of computer-readable instructions. The characteristics and values of characteristics at line 12 may also quantify how bluetooth communication module 323 transfers objects. That is, bluetooth communication module 323 may send objects from and receive objects at BLUETOOTH™ address 12af287b, may utilize bandwidth that results in a relative speed of 5000, and may utilize power that results in a relative power consumption of 3.

At line 13 the subelement "PROTOCOL" includes the attribute "TYPE". The subelement PROTOCOL indicates that subsequent data at line 13 is associated with a protocol that may be utilized by BLUETOOTH™ transfer mechanisms. The attribute TYPE at line 13 is associated with the value "SDP". The value SDP at line 13 may represent the Service Discovery Protocol ("SDP") and may indicate that BLUETOOTH™ transfer mechanisms are configured to utilize SDP to transfer an object. The characteristics and values of characteristics at line 13 may quantify how BLUETOOTH™ communication module 323 transfers objects. That is, BLUETOOTH™ communication module 323 may be configured to utilize SDP to transfer an object.

Shown at lines 15 through 19 is a preferred order of transfer mechanisms. A receiving system may include the instructions at lines 15 through 19 in intent-to-receive data. The ordering of subelements at lines 16 through 18 may indicate that wireless TCP/IP is the most preferred transfer mechanism, that IR is the next most preferred transfer mechanism, and that BLUETOOTH™ is the least preferred transfer mechanism.

The method in FIG. 5 may include a step for determining how the object should be sent (step 505). In some embodiments, step 505 may include a corresponding act of identifying compatible transfer mechanisms that may be used when sending the object from the sending computer system to the receiving computer system (act 503). A sending system may identify compatible transfer mechanisms by analyzing the transfer mechanisms a receiving computer system is configured to utilize, such as those transfer mechanisms included in the first and/or second group of computer-readable instructions. Data associated with transfer mechanisms may be contained in intent-to-receive data. For example, in FIG. 2, sending system 210 may receive data associated with transfer mechanisms in the data transfer represented by arrow 2.

Data associated with transfer mechanisms may be analyzed at any computer system included in sending system 210, including initiating computer system 211 and/or sending computer system 212. Identified compatible transfer mechanisms may be transfer mechanisms that both a sending computer system and a receiving computer system are configured to utilize. A sending system may also analyze data indicative of a preferred order of transfer mechanisms. When more preferred transfer mechanisms are not compatible with a sending computer system or receiving computer system, less preferred transfer mechanisms may be identified.

A transfer mechanism may viewed as incompatible, and thus not a compatible transfer mechanism, when the transfer mechanism is "not supported" by either a sending computer system or receiving computer system. A transfer mechanism may be viewed as not supported when modules associated with the transfer mechanism are not included in a computer system. A transfer mechanism may also be viewed as not supported when modules associated with a transfer mechanism are configured improperly or are not configured at all.

A transfer mechanism may also be viewed as incompatible due to network conditions, even if both a sending computer system and a receiving computer system are configured to utilize the transfer mechanism. For example, if at a time desired to transfer an object, network conditions have significantly reduced the bandwidth available to a transfer mechanism or have caused increased latency to be associated with the transfer mechanism, the transfer mechanism may be viewed as incompatible.

A transfer mechanism may also be viewed as incompatible due to restrictions enforced by an administrative entity. For example, a mobile carrier service provider may place time and/or usage restrictions on transfer mechanisms used by mobile computer systems. In some environments, a mobile computer system may utilize both shared and proprietary transfer mechanisms. Under a first set of conditions the shared transfer mechanism may be more advantageous and under a second set of conditions the proprietary transfer mechanism may be more advantageous. The mobile carrier service provider may wish to increase the chances of utilizing more advantageous transfer mechanisms by indicating that less advantageous transfer mechanisms are incompatible. Data expressly indicating that a transfer mechanism is incompatible may be included in intent-to-send or intent-to-receive data.

Step 505 may also include a corresponding act of selecting an appropriate transfer mechanism, based on the characteristics of the identified transfer mechanisms, for sending the object to the receiving computer system (act 504). A sending system may analyze identified transfer mechanisms, associated characteristics and/or values of associated characteristics when selecting an appropriate transfer mechanism. A sending system may analyze characteristics and values of characteristics, such as protocols, bandwidth, latency, network addresses, cost, signal strength, power consumption, packet size, support for authentication and/or encryption time to establish connection, or other characteristics that quantify the capabilities of a transfer mechanism. A sending system may also analyze characteristics of the object to be sent when selecting an appropriate transfer mechanism.

Hard-coded and/or user configurable decision logic may referred to when selecting an appropriate transfer mechanism. A sending system may refer to decision logic to compare values of one or more characteristics and select an appropriate transfer mechanism. For example, sending system 210 may refer to decision logic to process characteristics included in the first and/or second group of computer-readable instructions to select an appropriate transfer mechanism. Decision logic may be configured to select an appropriate transfer mechanism according to a preferred order received from a receiving system, such as receiving system 220.

In other embodiments, decision logic included in a sending system may be configured to ignore a preferred order and perform an analysis of the characteristics and values of characteristics of compatible transfer mechanisms. For example, sending system 210 may desire to always utilize compatible transfer mechanisms with higher relative speed values. Thus, even if a receiving system indicates GPRS is preferred over IR, decision logic included in sending system 210 may select IR. One or more characteristics and/or values of characteristics may be combined or aggregated by decision logic included in a sending system to generate a value representative of the appropriateness of a transfer mechanism. When aggregating or combining, decision logic included in a sending system may be configured to compare values that are representative of a plurality of associated characteristics and/or values of characteristics. The results of decision logic included in a sending system may be implemented to select an appropriate transfer mechanism.

A selected appropriate transfer mechanism may be a transfer mechanism that is carried over other transfer mechanisms. For example, a selected appropriate transfer mechanism may be Wireless TCPIP over GPRS. A selected appropriate transfer mechanism may also be a transfer mechanism that transfers an electronic message to an electronic messaging address that was included in intent-to-send data or intent-to receive data. For example, if intent-to-receive data includes the electronic mail address "jdoe@test.com", a selected appropriate transfer mechanism may include sending an electronic mail message to the address jdoe@test.com.

When an appropriate transfer mechanism is selected, an object may be sent from a sending computer system and received at a receiving computer system. As shown in FIG. 2 by arrow 3, an object is sent from sending computer system 212 and received at receiving system 222.

Figure 6:
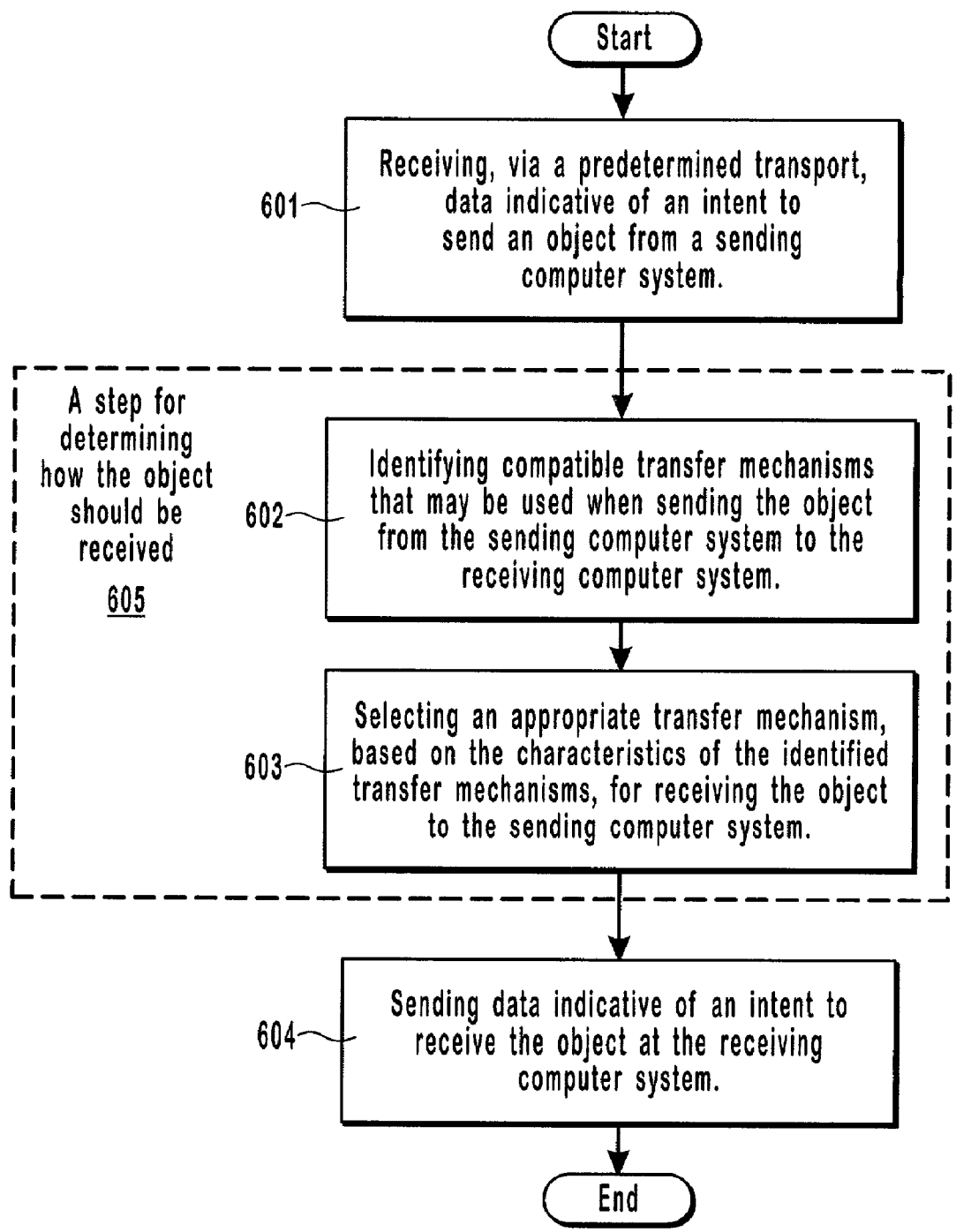
FIG. 6 is a flow diagram illustrating an example of a method for a receiving system to select an appropriate transfer mechanism for transferring an object.

FIG. 6 is a flow diagram illustrating an example of a method for a receiving system to select an appropriate transfer mechanism for transferring an object. The method in FIG. 6 will be discussed with reference to the functional components included in FIGS. 2 and 3.

The method in FIG. 6 may begin with receiving, via a predetermined transport, intent-to-send data from a sending computer system (act 601). As shown in FIG. 2 by arrow 1, intent-to-send data may be received at receiving system 220. Intent-to-send data may be received at any computer system included in sending system 220.

The method in FIG. 6 may include a step for determining how the object should be received (605). In some embodiments, step 605 may include a corresponding act of identifying compatible transfer mechanisms that may be used when sending the object from the sending computer system to the receiving computer system (act 602). A receiving system may identify compatible transfer mechanisms by analyzing the transfer mechanisms, associated characteristics and/or values of associated characteristics a sending computer system is configured to utilize, such as those included in the first and/or second group of computer-readable instructions. Data associated with transfer mechanisms may be contained in intent-to-send data. For example, in FIG. 2, receiving system 220 may receive data associated with transfer mechanisms in the data transfer represented by arrow 1.

Data associated with transfer mechanisms may be analyzed at any computer system included in receiving system 210, including negotiating computer system 211 and/or receiving computer system 212. Identified compatible transfer mechanisms may be transfer mechanisms that both a receiving computer system and a sending computer system are configured to utilize. A receiving system may also analyze data indicative of a preferred order of transfer mechanisms. When more preferred transfer mechanisms are not compatible with a receiving computer system or sending computer system, less preferred transfer mechanisms may be identified.

Step 605 may also include a corresponding act of selecting an appropriate transfer mechanism, based on the characteristics of the identified transfer mechanisms, for sending the object to the receiving computer system (act 603). A receiving system may analyze identified transfer mechanisms, associated characteristics and/or values of associated characteristics when selecting an appropriate transfer mechanism. A receiving system may analyze characteristics and values of characteristics, such as protocols, bandwidth, network addresses, latency, cost, signal strength, power consumption, packet size, support for authentication and/or encryption time to establish connection, or other characteristics that quantify the capabilities of a transfer mechanism. A receiving system may also analyze characteristics of the object to be received when selecting an appropriate transfer mechanism.

Hard-coded and/or user configurable decision logic may referred to when selecting an appropriate transfer mechanism. A receiving system may refer to decision logic to compare values of one or more characteristics and select an appropriate transfer mechanism. For example, receiving system 220 may refer to decision logic to process characteristics included in the first and/or second group of computer-readable instructions to select an appropriate transfer mechanism. Decision logic may be configured to select an appropriate transfer mechanism according to a preferred order received from a sending system, such as sending system 210.

In other embodiments, decision logic included in a receiving system may be configured to ignore a preferred order and perform an analysis of the characteristics and values of characteristics of compatible transfer mechanisms. For example, receiving system 220 may desire to always utilize compatible transfer mechanisms that consume lesser amounts of power. Thus, even if a sending system indicates IR is preferred over GPRS, decision logic included in receiving system 220 may select GPRS. One or more characteristics may be combined or aggregated by decision logic included in a receiving system to generate a value representative of the appropriateness of a transfer mechanism. When values of characteristics are aggregated, decision logic in a receiving system may be configured to compare values that are representative of a plurality of associated characteristics. The results of decision logic included in a receiving system may be implemented to select an appropriate transfer mechanism.

The method in FIG. 6 may include sending intent-to-receive data (act 604). As shown in FIG. 2 by arrow 2, this may include receiving system 220 sending intent-to-receive data to sending system 210.

Intent-to-send data and intent-to-receive data may vary over time. A sending system and/or receiving system may monitor network conditions and change such data to coincide with changes in network conditions. Thus, there is an increased chance that intent-to-send or intent-to-receive data includes transfer mechanisms, associated characteristics mechanisms, and values of associated characteristics that are accurate at the time an object is to be transferred. A sending or receiving system may modify computer-readable instructions intent-to-send or intent-to-receive data when network conditions change. In some embodiments, a sending or receiving system may receive network conditions in response to polling a network. In other embodiments, a sending or receiving system may receive network conditions for other external computer systems.

Figure 4B:
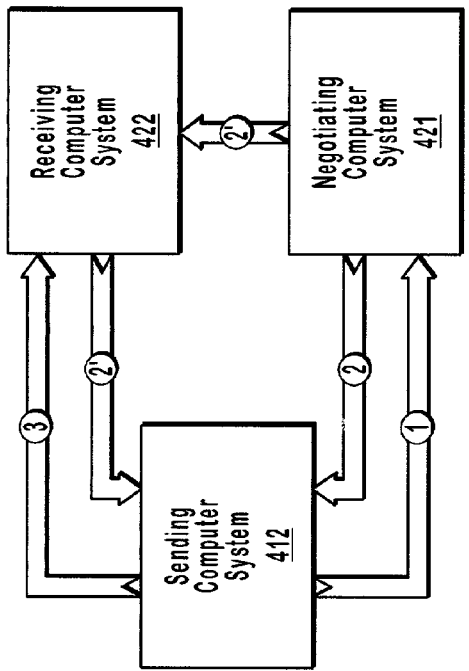
FIG. 4B illustrates an example of some sequences of communication between a sending computer system, a negotiating computer system, and a receiving computer system that may facilitate the transport of an object via a selected appropriate transfer mechanism.
Figure 4D:
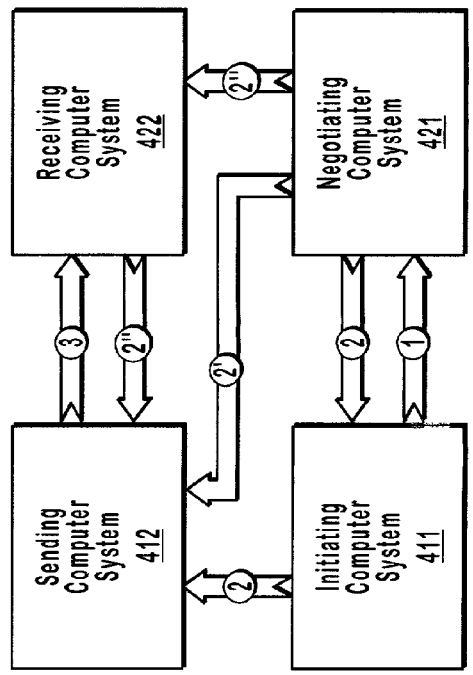
FIG. 4D illustrates an example of some sequences of communication between an initiating computer system, a negotiating computer system, a sending computer system, and a receiving computer system that may facilitate the transport of an object via a selected appropriate transfer mechanism.
Figure 4A:
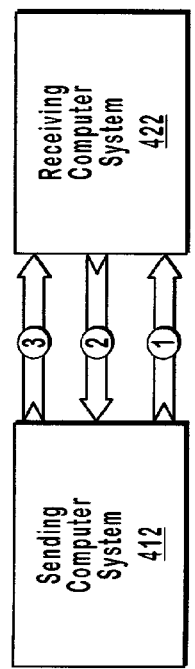
FIG. 4A illustrates an example of a sequence of communication between a sending computer system and a receiving computer system that may facilitate the transport of an object via a selected appropriate transfer mechanism.

FIG. 4A illustrates an example of a sequence of communication between a sending computer system and a receiving computer system that may facilitate the transport of an object via a selected appropriate transfer mechanism. In these embodiments, sending computer system 412 may be a computer system included in a sending system and receiving computer system 422 may be a computer system included in a receiving system. Arrow 1 in FIG. 4A may represent the transfer of intent-to-send data from sending computer system 412. Arrow 2 in FIG. 4A may represent the transfer of intent-to-receive data from receiving computer system 422. Arrow 3 in FIG. 4A may represent the transfer of the object via a selected appropriate transfer mechanism.

FIG. 4B illustrates an example of some sequences of communication between a sending computer system, a negotiating computer system, and a receiving computer system that may facilitate the transport of an object via a selected appropriate transfer mechanism. In these embodiments, sending computer system 412 may be a computer system included in a sending system and negotiating computer systems 421 and receiving computer system 422 may be computer systems included in a receiving system. Arrow 1 in FIG. 4B may represent the transfer intent-to-send data from sending computer system 412. Arrow 2 in FIG. 4B may represent the transfer of intent-to-receive data from receiving computer system 422. Alternately, the arrows 2' in FIG. 4B may represent the transfer of intent-to-receive data from receiving computer system 422. In these alternate embodiments, negotiating computer system 421 may forward intent-to-send and/or intent-to-receive data to receiving computer system 422. Receiving computer system 422 may then transfer the intent-to-receive data to sending computer system 412. Arrow 3 in FIG. 4B may represent the transfer of the object via a selected appropriate transfer mechanism.

Figure 4C:
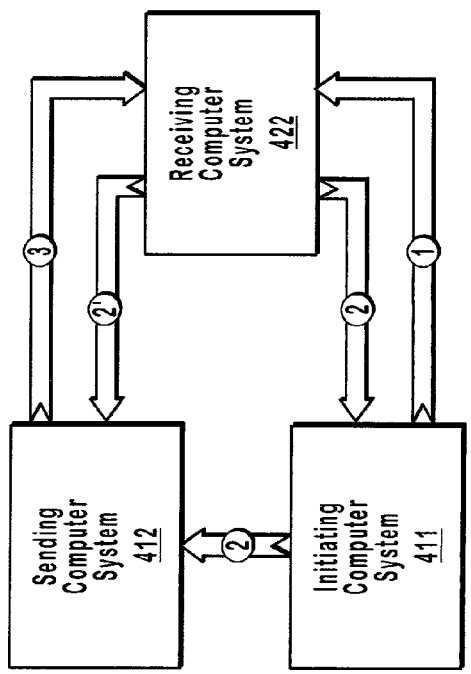
FIG. 4C illustrates an example of some sequences of communication between an initiating computer system, a sending computer system, and a receiving computer system that may facilitate the transport of an object via a selected appropriate transfer mechanism.

FIG. 4C illustrates an example of some sequences of communication between an initiating computer system, a sending computer system, and a receiving computer system that may facilitate the transfer of an object via a selected appropriate transfer mechanism. In these embodiments, initiating computer system 411 and sending computer system 412 may be computer systems included in a sending system and receiving computer system 422 may be a computer system included in a receiving system. Arrow 1 in FIG. 4C may represent the transfer of intent-to-send data from sending computer system 412. The arrows 2 in FIG. 4C may represent the transfer of intent-to-receive data from receiving computer system 422. In these embodiments, receiving computer system 422 may send intent-to-receive data to initiating computer system 411. Initiating computer system 411 may then forward the intent-to-receive data to sending computer system 412. Alternately, arrow 2' in FIG. 4B may represent the transfer of intent-to-receive data from receiving computer system 422. Arrow 3 in FIG. 4C may represent the transfer of the object via a selected appropriate transfer mechanism.

FIG. 4D illustrates an example of some sequences of communication between an initiating computer system, a negotiating computer system, a sending computer system, and a receiving computer system that may facilitate the transfer of an object via a selected appropriate transfer mechanism. In these embodiments, initiating computer system 411 and sending computer system 412 may be computer systems included in a sending system and negotiating computer system 421 and receiving computer system 422 may be a computer systems included in a receiving system.

Arrow 1 in FIG. 4D may represent the transfer of intent-to-send data from sending computer system 412. The arrows 2 in FIG. 4D may represent the transfer intent-to-receive data from receiving computer system 422. In these embodiments, receiving computer system 422 may send data intent-to-receive data to initiating computer system 411. Initiating computer system 411 may then forward the intent-to-receive data to sending computer system 412. Alternately, Arrow 2' in FIG. 4D may represent the transfer of intent-to-receive data from receiving computer system 422. Alternately, the arrows 2" in FIG. 4D may represent the transfer of intent-to-receive data from receiving computer system 422. In these alternate embodiments, negotiating computer system 421 may forward intent-to-send data and/or intent-to-receive data to receiving computer system 422. Receiving computer system 422 may then transfer the intent-to-receive data to sending computer system 412. Arrow 3 in FIG. 4B may represent the transfer on an object via a selected appropriate transfer mechanism.

It should be understood that the sequences of communication illustrated in FIGS. 4A, 4B, 4C, and 4D are merely examples of some of the possible sequences of communication that may facilitate transfer of an object via a selected appropriate transfer mechanism. It would be apparent to one skilled in the art, after having reviewed this description, that a variety of communication sequences may be utilized to facilitate transfer of an object via a selected appropriate transfer mechanism.

Transferring intent-to-send and intent-to-receive data between sending and receiving systems relieves users from having to enter configuration information to facilitate the transfer of an object. The use of decision logic to analyze intent-to-send and intent-to-receive data increases the chance that a selected transfer mechanism is indeed an appropriate transfer mechanism based on current network conditions. That is, computer systems may perform calculations at a rate much greater than a user and thus there is an increased chance of selecting an appropriate transfer mechanism when network conditions change.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes at least a sending computer system and a receiving computer system, a method for negotiating a transfer mechanism to utilize when sending an object from the sending computer system to the receiving computer system, the method comprising:
    an act of a sending computer system sending, via a predetermined transport, first data indicative of an intent to send an object from the sending computer system to a receiving computing system;
    an act of the sending computer system receiving second data indicative of an intent to receive the object at the receiving computer system, the second data including both a plurality of transfer mechanisms that the receiving computer system is configured to utilize as well as corresponding and specific characteristics for each of the plurality of transfer mechanisms that the receiving computer system is configured to utilize, wherein the specific characteristics quantify how each of the corresponding transfer mechanisms transfer objects;
    an act of identifying transfer mechanisms that are compatible between the sending computer system and the receiving computer system that may be used when transferring the object from the sending computer system to the receiving computer system; and
    an act of selecting an appropriate transfer mechanism from the identified transfer mechanisms, based at least in part on an analysis of the corresponding and specific characteristics of the identified transfer mechanisms, for sending the object to the receiving computer system.

2. The method as recited in claim 1, wherein the act of sending the first data comprises: p1 an act of sending the first data via a transport that does not utilize a network address when facilitating the transfer of data.

3. The method as recited in claim 1, wherein the act of sending the first data comprises:
    an act of sending the first data utilizing an IR transfer mechanism.

4. The method as recited in claim 1, wherein the act of sending the first comprises:
    an act of sending the first data utilizing an SMS transfer mechanism.

5. The method as recited in claim 1, wherein the act of sending the first data comprises:
    an act of sending data indicative of transfer mechanisms the sending computer system is configured to utilize.

6. The method as recited in claim 1, wherein the act of sending the first data comprises:
    an act of sending characteristics of transfer mechanisms the sending computer system is configured to utilize.

7. The method as recited in claim 1, wherein the act of sending the first data comprises:
    an act of sending values that are associated with characteristics of transfer mechanisms the sending computer system is configured to utilize.

8. The method as recited in claim 1, wherein the act of sending the first data comprises:
    an act of an initiating computer system sending the first data.

9. The method as recited in claim 1, wherein the act of sending the first data comprises:
    an act of the sending computer system sending the first data.

10. The method as recited in claim 1, wherein the act of receiving the second data comprises:
    an act of receiving values that are associated with characteristics of transfer mechanisms the receiving computer system is configured to utilize.

11. The method as recited in claim 1, wherein the act of receiving the second data comprises:
    an act of an initiating computer system receiving the second data.

12. The method as recited in claim 1, wherein the act of receiving the second data comprises:
    an act of the sending computer system receiving the second data.

13. The method as recited in claim 1, wherein the act of identifying the transfer mechanisms comprises:
    an act of comparing the transfer mechanisms the sending computer system is configured to utilize to the transfer mechanisms the receiving computer system is configured to utilize.

14. The method as recited in claim 13, wherein the act of comparing the transfer mechanisms the sending computer system is configured to utilize to the transfer mechanisms the receiving computer system is configured to utilize comprises:

an act of an initiating computer system comparing the transfer mechanisms the sending computer system is configured to utilize to the transfer mechanisms the receiving computer system is configured to utilize.

15. The method as recited in claim 13, wherein the act of comparing the transfer mechanisms the sending computer system is configured to utilize to the transfer mechanisms the receiving computer system is configured to utilize comprises:

an act of the sending computer system comparing the transfer mechanisms the sending computer system is configured to utilize to the transfer mechanisms the receiving computer system is configured to utilize.

16. The method as recited in claim 1, wherein the act of identifying the transfer mechanisms comprises:

an act of determining network conditions associated with a transfer mechanism.

17. The method as recited in claim 1, wherein the act of identifying the transfer mechanisms comprises:

an act of determining usage restrictions associated with a transfer mechanism.

18. The method as recited in claim 1, wherein the act of identifying the transfer mechanisms comprises:

an act of an initiating computer system identifying the transfer mechanisms.

19. The method as recited in claims 1, wherein the act of identifying the transfer mechanisms comprises:

an act of the sending computer system identifying the transfer mechanisms.

20. The method as recited in claims 1, wherein the act of selecting the appropriate transfer mechanism comprises:

an act of comparing characteristics of the identified transfer mechanisms.

21. The method as recited in claims 1, wherein the act of selecting the appropriate transfer mechanism comprises:

an act of comparing values of characteristics associated with the identified transfer mechanisms.

22. The method as recited in claims 1, wherein the act of selecting the appropriate transfer mechanism comprises:

an act of combining characteristics of one of the identified transfer mechanisms to generate a representative value of the appropriateness of the transfer mechanism.

23. The method as recited in claims 1, wherein the act of selecting the appropriate transfer mechanism comprises:

an act of an initiating computer system selecting the appropriate transfer mechanism.

24. The method as recited in claims 1, wherein the act of selecting the appropriate transfer mechanism comprises:

an act of the sending computer system selecting the appropriate transfer mechanism.

25. The method as recited in claim 1, further comprising:

an act of the sending computer system utilizing the selected transfer mechanism to send the object to the receiving computer system.

26. The method as recited in claim 1, wherein the characteristics of the identified transfer mechanisms comprise a bandwidth characteristic of the identified transfer mechanisms.

27. The method as recited in claim 1, wherein the characteristics of the identified transfer mechanisms comprise a latency characteristic of the identified transfer mechanisms.

28. The method as recited in claim 1, wherein the characteristics of the identified transfer mechanisms comprise a signal strength characteristic of the identified transfer mechanisms.

29. The method as recited in claim 1, wherein the characteristics of the identified transfer mechanisms comprise a packet size characteristic of the identified transfer mechanisms.

30. The method as recited in claim 1, wherein the characteristics of the identified transfer mechanisms comprise a power consumption characteristic of the identified transfer mechanisms.

31. The method as recited in claim 1, wherein the characteristics of the identified transfer mechanisms comprise a support for authentication and/or encryption characteristic of the identified transfer mechanisms.

32. The method as recited in claim 1, wherein the characteristics of the identified transfer mechanisms comprise a time to establish a connection characteristic of the identified transfer mechanisms.

33. The method as recited in claim 1, wherein the characteristics of the identified transfer mechanisms comprise a cost characteristic of the identified transfer mechanisms.

34. The method as recited in claim 1, wherein the characteristics of the identified transfer mechanisms comprise a network address characteristic of the identified transfer mechanisms.

35. The method as recited in claim 1, wherein the characteristics of the identified transfer mechanisms comprise a telephone number characteristic of the identified transfer mechanisms.

36. The method as recited in claim 1, wherein the characteristics of the identified transfer mechanisms comprise a subnet mask characteristic of the identified transfer mechanisms.

37. The method as recited in claim 1, wherein the characteristics of the identified transfer mechanisms comprise a port identification characteristic of the identified transfer mechanisms.

38. The method as recited in claim 1, wherein the characteristics of the identified transfer mechanisms comprise a speed characteristic of the identified transfer mechanisms.

39. The method as recited in claim 1, wherein the act of identifying the transfer mechanisms comprises:

an act of identifying wireless transfer mechanisms.

40. The method as recited in claim 1, wherein:

the act of sending the first data is performed by the sending computer system sending the first data to a negotiating computer system; and the act of receiving the second data is performed by the sending computer system receiving the second data from the negotiating computer system through the receiving computer system.

41. A method as recited in claim 1, wherein the sending computer system ignores a preferred order of appropriate transfer mechanisms received from the receiving computer system.

42. A method as recited in claim 1, wherein the specific characteristics of the transfer mechanisms includes at least one characteristic other than a transfer rate.

43. A method as recited in claim 1, wherein the predetermined transport comprises IR.

44. A method as recited in claim 1, wherein the specific characteristics are identified in XML.

45. A method as recited in claim 1, wherein the selection of the appropriate transfer mechanism is also based at least in part on an analysis of the object to be sent.

46. In a network environment that includes at least a sending computer system and a receiving computer system, a method for negotiating a transfer mechanism to utilize when sending an object from the sending computer system to the receiving computer system, the method comprising:
 an act of a sending computer system sending, via a predetermined transport, first data indicative of an intent to send an object from the sending computer system to a receiving computer system;
 an act of the sending computer system receiving second data indicative of an intent to receive the object at the receiving computer system, the second data including both a plurality of transfer mechanisms that the receiving computer system is configured to utilize as well as corresponding and specific characteristics for each of the plurality of transfer mechanisms that the receiving computer system is configured to utilize, wherein the specific characteristics quantify how each of the corresponding transfer mechanisms transfer objects; and
 a step for determining how the object should be sent so as to relieve a user from manually entering configuration information, and based at least in part on the corresponding and specific characteristics of the identified transfer mechanisms.

47. In a network environment that includes at least a sending computer systems and a receiving computer system, a method for negotiating a transfer mechanism to use when transferring an object from the sending computer system to the receiving computer system, the method comprising:
 an act of receiving at a receiving computer system, via a predetermined transport, first data indicative of an intent to send an object from a sending computer system to the receiving computing system;
 an act of the receiving computer system identifying transfer mechanisms that are compatible between the sending computer system and the receiving computer system that may be used when transferring the object from the sending computer system to the receiving computer system;
 an act of the receiving computer system selecting an appropriate transfer mechanism from the identified transfer mechanisms, based on the characteristics of the identified transfer mechanisms, for receiving the object from the sending computer system; and
 an act of the receiving computer system sending second data indicative of an intent to receive the object at the receiving computer system, the second data including both a plurality of transfer mechanisms that the sending computer system is configured to utilize as well as corresponding and specific characteristics for each of the plurality of transfer mechanisms that the sending computer system is configured to utilize, wherein the specific characteristics quantify how each of the corresponding transfer mechanisms transfer objects.

48. The method as recited in claim 47, wherein the act of receiving the first data comprises:
 an act of receiving values that are associated with characteristics of transfer mechanisms the sending computer system is configured to utilize.

49. The method as recited in claim 47, wherein the act of receiving the first data comprises:
 an act of a negotiating computer system receiving the first data.

50. The method as recited in claim 47, wherein the act of receiving the first data comprises:
 an act of the receiving computer system receiving the first data.

51. The method as recited in claim 47, wherein the act of identifying the transfer mechanisms comprises:
 an act of a negotiating computer system identifying the transfer mechanisms.

52. The method as recited in claim 47, wherein the act of identifying the transfer mechanisms comprises:
 an act of the receiving computer system identifying the transfer mechanisms.

53. The method as recited in claim 47, wherein the act of selecting the appropriate transfer mechanism comprises:
 an act of a negotiating computer system selecting the appropriate transfer mechanism.

54. The method as recited in claim 47, wherein the act of selecting the appropriate transfer mechanism comprises:
 an act of the receiving computer system selecting the appropriate transfer mechanism.

55. The method as recited in claims 47, wherein the act of sending the second data comprises:
 an act of sending data indicative of transfer mechanisms the receiving computer system is configured to utilize.

56. The method as recited in claims 47, wherein the act of sending the second data comprises:
 an act of sending values that are associated with characteristics of transfer mechanisms the receiving computer system is configured to utilize.

57. The method as recited in claims 47, wherein the act of sending the second data comprises:
 an act of act a negotiating computer system sending the second data.

58. The method as recited in claims 47, wherein the act of sending the second data comprises:
 an act of the receiving computer system sending the second data.

59. The method as recited in claim 47, further comprising:
 an act of the receiving computer system utilizing the selected transfer mechanism to receive the object from the sending computer system.

60. A computer program product for use in a network environment that includes at least a sending system and a receiving system, the computer program product for implementing a method for negotiating a transfer mechanism to utilize when sending an object from a sending computer system included in the sending system to a receiving computer system included in the receiving system, the computer program product comprising:
 one or more computer-readable media carrying computer-executable instructions, that when executed at the receiving system, cause the receiving system to perform the method recited in claim 47.

61. The computer program product as recited claim 60, wherein the one or more computer-readable media include physical storage media.

62. The computer program product as recited claim 60, wherein the one or more computer-readable media include system memory.

63. In a network environment that includes at least a sending computer systems and a receiving computer system, a method for negotiating a transfer mechanism to use when transferring an object from the sending computer system to the receiving computer system, the method comprising:
 an act of receiving at a receiving computer system, via a predetermined transport, first data indicative of an intent to send an object from a sending computer system to a receiving computing system;
 a step for determining, at the receiving computer system, how the object should be received so as to relieve a user from having to enter configuration information; and an act of the receiving computing system sending second data indicative of an intent to receive the object at the receiving computer system, the second data including both a plurality of transfer mechanisms that the sending computer system is configured to utilize as well as corresponding and specific characteristics for each of the plurality of transfer mechanisms that the sending computer system is configured to utilize, wherein the specific characteristics quantify how each of the corresponding transfer mechanisms transfer objects.

64. A computer program product for use in a network environment that includes at least a sending system and a receiving system, the computer program product for implementing a method for negotiating a transfer mechanism to utilize when sending an object from a sending computer system included in the sending system to a receiving computer system included in the receiving system, the computer program product comprising:

one or more computer-readable media carrying computer-executable instructions, that when executed at the sending system, cause the sending system to perform the method recited in claim 1.

65. The computer program product as recited claim 64, wherein the one or more computer-readable media include physical storage media.

66. The computer program product as recited claim 64, wherein the one or more computer-readable media include system memory.

* * * * *